UNITED STATES PATENT OFFICE.

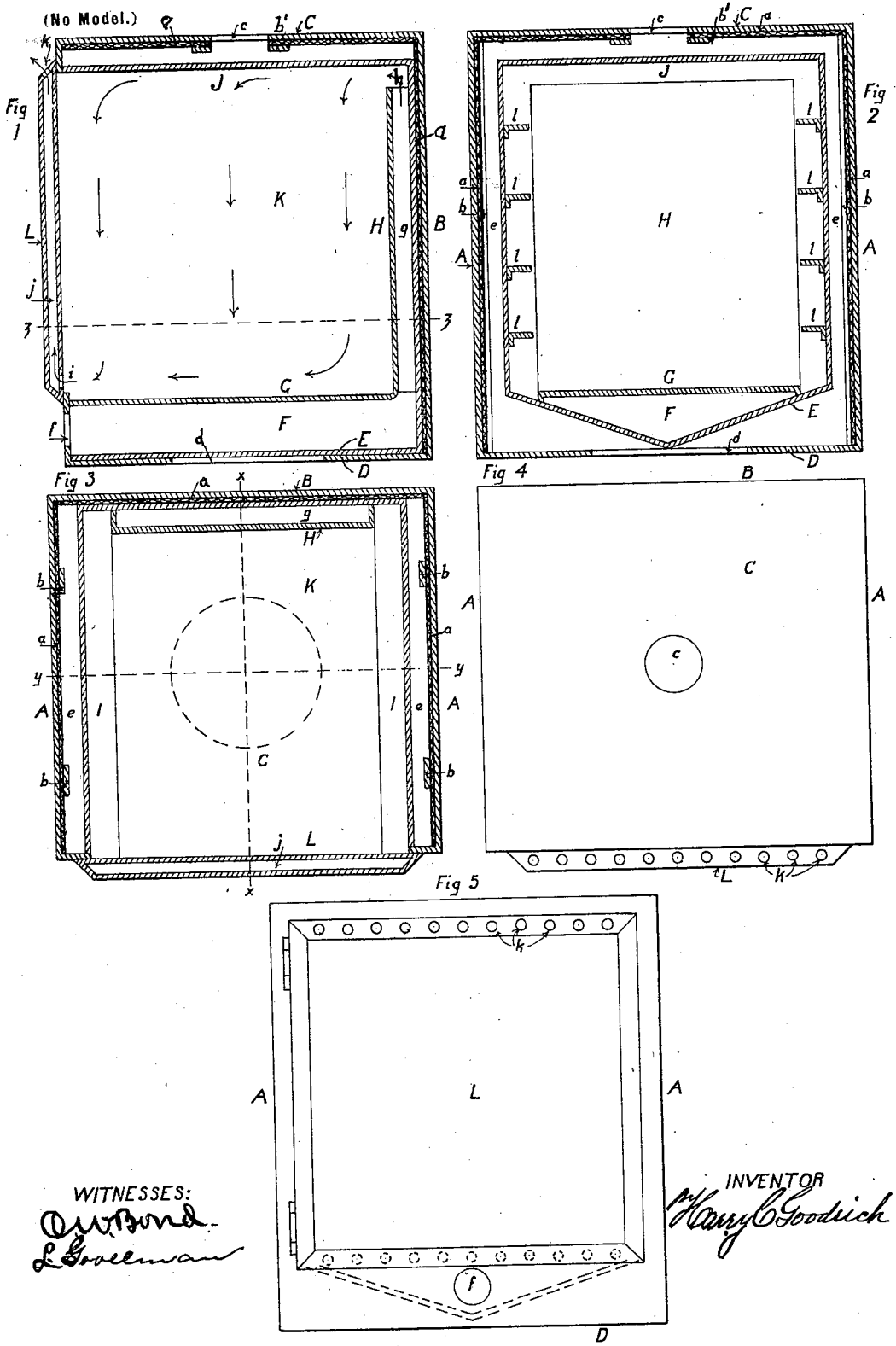

HARRY C. GOODRICH, OF CHICAGO, ILLINOIS.

BAKING OR ROASTING OVEN.

SPECIFICATION forming part of Letters Patent No. 658,840, dated October 2, 1900.

Application filed October 5, 1898. Serial No. 692,697. (No model.)

*To all whom it may concern:*

Be it known that I, HARRY C. GOODRICH, of Chicago, in the county of Cook and State of Illinois, have invented certain new and useful Improvements in Baking or Roasting Ovens; and I do hereby declare that the following is a full, clear, and exact description thereof, reference being had to the accompanying drawings, and to the letters of reference marked thereon, which form a part of this specification.

Figure 1 is a vertical section on line $xx$ of Fig. 3. Fig. 2 is a vertical section on line $yy$ of Fig. 3 looking toward the rear of the oven. Fig. 3 is a horizontal section looking down. Fig. 4 is a top or plan view. Fig. 5 is a front elevation.

Ovens for baking and roasting perform their work in the best and most successful manner when a supply of fresh pure air under the requisite heat is admitted to the interior of the oven or baking and roasting chamber. This admission of fresh pure air under the necessary heat should be, in order to perform the work as it should be performed, a constant and continuous supply and be evenly and uniformly distributed throughout the baking or roasting chamber. The proper circulation of the fresh pure air supplied to the baking and roasting chamber is necessary in order to distribute the air evenly and uniformly, and at the same time the air must be drawn out of the chamber in order to carry away any vapors or gases arising from the baking or roasting operation. A constant and continuous supply of fresh pure air discharged in the proper heated condition into the baking or roasting chamber not only materially reduces the time required to bake or roast the article, but also improves the quality and greatly reduces the amount of shrinkage or loss, as it is well known that ovens not supplied with fresh pure air will not do high-class satisfactory work, but are liable to burn or bake or roast hard and dry, rendering the operation unsatisfactory in every way, and for this reason attempts have been made to obtain a supply of fresh pure air to the interior of the oven.

The object of this invention is to overcome the objections and difficulties of previous ovens of the fresh-air class and obtain a constant and continuous supply of fresh pure air and have such air free from the products of combustion discharged into the baking or roasting chamber at or near the top or ceiling, distributed through such chamber in an even and uniform manner, and drawn off therefrom at or near the bottom continuously, so that the chamber will be supplied with fresh pure air during the baking or roasting; and to this end the invention consists in a constant and continuous supply of fresh pure air drawn from the outside into an air-heating chamber located within and separate and distinct from the heat-chamber proper, discharging the air in a properly-heated condition solely from the air-heating chamber, free and clear from the products of combustion, into the top of the baking or roasting chamber and withdrawing the air from the chamber at the bottom, thereby creating a downward draft, by which the air admitted at the top of the chamber is drawn or forced down through the chamber to the bottom, producing an even and uniform distribution of hot pure air through the chamber, and having such air come in contact with and act upon the top and sides of the article being baked or roasted; and the invention consists in the several parts and combination of parts hereinafter described, and pointed out in the claims as new for attaining the objects sought.

In the drawings, A represents the end or side walls of an outer shell or casing of an oven made of sheet-iron or other suitable material.

B is the rear or back wall of the outer shell or casing of the oven, also made of sheet-iron or other material. The walls A and B can be made of a single piece of material turned to form the respective walls, or they can be made of separate pieces suitably joined at the corners.

C is the top or upper wall of the outer shell or casing of the oven, also made of sheet-iron or other suitable material, joined or united in any well-known manner to the walls A and B and having an opening or hole $c$ for the discharge of the products of combustion, the walls A B C having an inner lining $a$, of asbestos or other non-conducting heat material, which, as shown, is secured to the walls A and B by metal strips $b$ and to the top or wall C by a metal ring $b'$ around the opening or hole $c$; but the non-conducting material can be secured to the walls by other means.

D is the bottom or lower wall of the outer shell or casing of the oven, also made of sheet-iron or other suitable material, joined or united to the walls A and B in any well-known manner and having, as shown, a central opening or hole $d$ for the entrance or passage of the heat from the stove or burner into the heat-chamber above the bottom D, but which could have other means for transmitting the heat.

E is a heat deflecting and distributing plate inclined upward both ways from the center and having its apex or center in line with the heat-supply opening $d$, thus forming on each side of the apex or center between the deflecting and distributing wall E and the bottom or lower wall D a heat space or chamber, each section or division of which leads into a flue $e$ on each end or side of the oven and extending across the top of the oven in communication with the exit $c$ for the heat and products of combustion to pass up and around the baking or roasting chamber on the sides and over and out at the top.

F is the receiving and heating chamber for the fresh pure air, which is supplied thereto from the outside through an opening or hole $f$ at the front of the oven, which chamber has its bottom formed by the deflecting and distributing plate E for the air admitted to the chamber to be subjected to the heat transmitted to and by the plate E, which receives heat from the stove or flame, which plate also forms a partition between the heat-chamber and the air receiving and heating chamber, locating such chamber within the heat-chamber, but distinct and separate therefrom, keeping the air free and clear from the products of combustion.

G is a plate or wall, made of sheet-iron or other suitable material, located within the baking or roasting chamber and forming the top of the chamber F and having, as shown, its end or side edge turned down to lie against the plate or wall E, so as to inclose the air-heating chamber F on the top, bottom, and ends or sides and insure the admission and transmission of pure air only to the baking or roasting chamber.

H is a rear plate or wall extending up from the plate or wall G to near the top of the baking or roasting chamber, which plate or wall can be formed with the plate or wall G by turning a piece of sheet-iron or other suitable material for the two plates or walls to stand at right angles to each other, or it can be a separate piece of metal suitably attached to the plate or wall G or otherwise affixed in place to have a flue or passage $g$ between it and the back or rear wall B, communicating with the inclosed air-heating chamber F, with an exit or discharge opening or passage $h$ at the top of the flue and into the baking or roasting chamber.

I represents the end or side walls of the baking or roasting chamber, made of sheet-tin or other suitable material and so located with reference to the outer end or side walls A as to leave a flue or passage $e$ on each end or side for the transmission of heat and the products of combustion.

J is the top or upper wall of the baking or roasting chamber, also made of sheet-tin or other suitable material. The walls I J can be made of a single piece of material turned to form the respective walls, or they can be made of separate pieces suitably joined at the corners, and the end or side walls are to be secured in a suitable manner to the deflecting or distributing plate E. The top or upper wall J is so located in relation to the top or wall C as to leave a passage or flue, forming a continuation of the passages or flues $e$ and communicating with the opening or hole $c$ for the discharge of the products of combustion.

K is the baking or roasting chamber, formed by the walls I and J and the back or rear walls B of the outer shell or casing.

L is the door, hinged at one side in any usual and well-known manner and having a suitable latch or catch by which it can be tightly closed and locked. This door has double plates or walls and at its lower end is provided, as shown, with a series of holes $i$ or an inlet or opening leading into a flue $j$, formed by the double plates or walls of the door, which flue or passage $j$ communicates with a series of holes $k$ or an outlet or opening in the outer plate or wall of the door, so that the air in the chamber K will be drawn through the holes $i$ into the flue or passage $j$ and discharged through the holes $k$.

The end or side walls I are provided with brackets or rests $l$ for the reception of racks or plates on which to place the article to be baked or roasted. The racks or plates are not shown, but can be of any of the usual and ordinary constructions of such devices.

The oven is designed for use with a gas, gasolene, or other stove by placing the oven on top of the stove for the opening $d$ to be over and in line with the burner, and, as shown, it is designed for a single burner, but can be made for two burners by widening the oven and providing the bottom with two openings or holes, or the oven can be used with a burner alone or with other forms of stoves so long as the heat and flame can be brought in contact with the plate or wall E to heat the air-chamber F, as required to produce the necessary heat for the air to perform the baking or roasting and not permit the air to be supplied in a cool condition to retard the baking or roasting.

In use the air from the outside enters the chamber F through the opening $f$ or other source of supply and is subjected to the heat of the fire or flame in such chamber without coming in contact with the heat or flame, so that it is not commingled with the products of combustion, but remains pure and uncontaminated, which is very desirable, as it prevents the article from being baked or roasted with the products of combustion. The air, properly heated, passes from the chamber F through the flue or passage $g$ and rises or ascends therein, to be discharged at the opening or mouth $h$ into the baking or roasting chamber at the top or upper portion, and such air is drawn down through the chamber by the exhaust at the bottom or lower portion formed by the openings or holes $i$, flue or passage $j$, and openings or holes $k$, to be discharged from the chamber.

It will be seen that only pure air in a hot condition is discharged at or made to enter the upper portion of the baking or roasting chamber and is then forced to descend in such chamber, which causes it to come in contact with the top and sides of the article in the chamber, distributing the air uniformly and evenly throughout the chamber and over and around the article or articles being baked or roasted instead of having the heat applied solely to the bottom of the pan or vessel. It will also be seen that a constant supply of new air is supplied all the time, preventing the burning and drying up of the article and maintaining the article or articles in the best possible condition, improving the quality of the baking or roasting and reducing the amount of shrinkage or loss.

The discharge or exhaust from the baking or roasting chamber must conform to the supply, so that the air will not be withdrawn without effecting its purpose, and, if desired, a damper or regulator can be provided for either the supply or exhaust, or for both, to regulate the amount supplied and discharged. The inlet for the air must be at the top and the outlet at the bottom of the baking or roasting chamber, and instead of having the outlet through the door tubes or other conduits could be provided at the corners or other places in the chamber to produce the exhaust, and the supply could be by flues or passages on the ends or sides instead of the rear, the only requisite being that the construction shall be one supplying the heated air at the top or upper portion of the chamber and discharging it at the bottom or lower portion thereof.

The oven when not in use can be set on the floor or to one side, or it can be placed permanently on a shelf or support and a burner or heater located beneath it to supply or furnish the requisite heat for use.

It is the universal fault with ordinary ovens in which the heat or air ascends direct from the bottom to the top that the article being baked or roasted is baked or roasted too fast and usually burned on the bottom, while the top and sides are underdone or unbaked. This defect and trouble arises by reason of the hot blast striking the bottom of the pan or vessel containing the article being baked or roasted, with which bottom the article is in contact, the result being an excess of heat on the bottom and a want of sufficient heat on the top or sides, because the hot blast rushes upward, seeking an exit, and cannot act on the top and sides of the article. This fault is avoided and the defect and trouble wholly overcome by my construction, in which the current or draft of pure hot air is drawn or forced downward from the top or ceiling of the baking or roasting chamber, preventing an excess of heat on the under side or bottom of the article and subjecting practically the entire surface of the article to the same degree of heat, making a uniform bake or roast, which end is had by the downdraft of the pure hot air operating on the top and sides, while the radiated heat of the pan or vessels acts on the bottom or under side. The trouble and annoyance of an excess of heat on the bottom is completely overcome, with the result of perfect and even baking or roasting by the use of a pure-air supply, transmitted into the baking or roasting chamber at the top or ceiling and withdrawn at the bottom or lower portion, because the blast is downward and not upward, by which arrangement the bottom of the pan or vessel is not subjected to an upward blast, but merely radiates the heat required for even and perfect work.

What I claim as new, and desire to secure by Letters Patent, is—

1. In an oven, the combination of an outer casing and an inner baking-chamber, the casing and chamber separated to form a flue or passage for conducting the heat and products of combustion upward exteriorly of the baking-chamber, and a combustion-chamber formed within and by the outer casing below the baking-chamber and having an air-heating chamber communicating with the outer air, the baking-chamber having a hot-air flue leading to its upper portion from the hot-air chamber, and an air-exit at its lower portion, with the baking-chamber closed against the admission of products of combustion, substantially as described.

2. In an oven the combination of an outer casing and an inner baking-chamber spaced apart to form flues and a combustion-chamber between them, and having a heat conducting and transmitting plate for the combustion-chamber separating such chamber from an air-heating chamber at the bottom of the baking-chamber, the air-heating chamber communicating with the outer air and the baking-chamber having an air-conducting flue leading to its upper portion from the air-heating chamber, and an exit or flue at its lower portion, with the baking-chamber closed against the admission of the products of combustion thereinto, substantially as described.

3. In an oven, the combination of an outer casing and an inner baking-chamber, the casing and chamber being spaced apart to form a combustion-chamber at the bottom of the baking-chamber, and flues for the escape of the products of combustion exteriorly of the baking-chamber at the sides and top thereof, the baking-chamber being formed with an air-heating chamber at its bottom portion communicating with the outer air, and the baking-chamber having also an air-conducting flue leading to its upper portion from the air-heating chamber, and an air-exit flue leading from its lower portion to the outer air and having the bottom plate of said chamber formed and arranged to deflect the products of combustion and to conduct heat to the air-heating chamber, substantially as described.

4. In an oven, the combination of a baking-chamber closed against the admission of the products of combustion thereinto and having at its bottom an air-heating chamber one side of which is formed by a heat-transmitting plate, the said air-heating chamber having communication with the outer air and the said inner baking-chamber having an air-conducting flue leading to its upper portion from the air-heating chamber and with an air-exit flue at its lower portion, for entering pure hot air only to the baking-chamber, substantially as described.

In testimony that I claim the foregoing as my invention I affix my signature, in presence of two witnesses, this 1st of October, A. D. 1898.

HARRY C. GOODRICH.

Witnesses:
BERTHA A. PRICE,
R. CUTHBERT VIVIAN.